March 31, 1953     H. HEDSTROM     2,632,950

SHEET CUTTING TOOL

Filed Sept. 10, 1951

INVENTOR.
Harold Hedstrom
BY
ATTORNEY.

Patented Mar. 31, 1953

2,632,950

UNITED STATES PATENT OFFICE 2,632,950

SHEET CUTTING TOOL

Harold Hedstrom, Denville, N. J.

Application September 10, 1951, Serial No. 245,880

5 Claims. (Cl. 30—241)

This invention relates to a tool for cutting sheet material of various types and kinds and, particularly, sheet metal. More particularly, the invention deals with a tool of this type and kind which is generally characterized as a nibbling tool, wherein a punch is reciprocated at high speed in the direction of a die in the operation of cutting, trimming or otherwise shaping sheet material of various types and kinds. Still more particularly, the invention deals with a tool of the character described, having a readily attachable and adjustable tool head, so that the tool stock adjacent the reciprocating punch can be disposed in different angular positions to adapt the tool for many uses.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
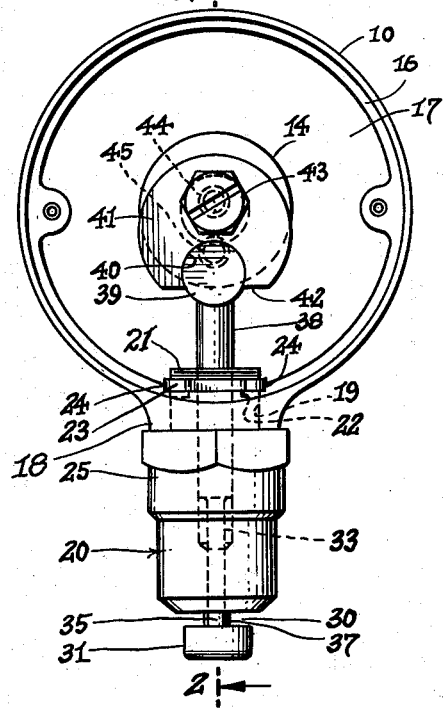
Fig. 1 is a face view of a tool made according to my invention, showing the cover plate removed and illustrating parts in an extended position for adjustment thereof.
Figure 2:
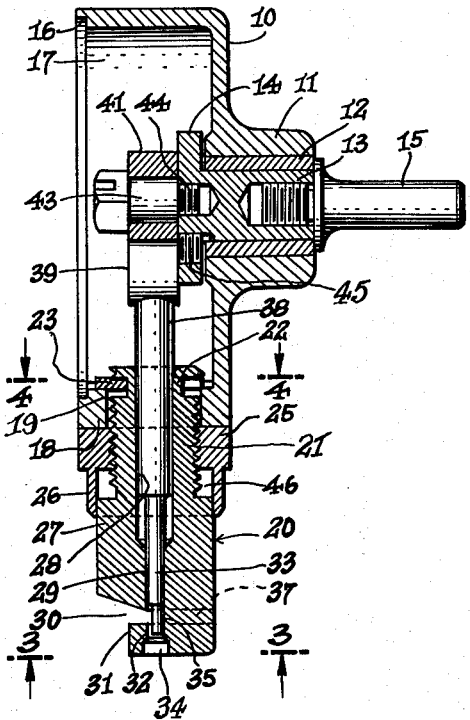
Fig. 2 is a section on the line 2—2 of Fig. 1, showing the parts in assembled position.

In Figs. 1 and 2 of the drawing, I have shown at 10 the casing of my improved tool, which has a center projecting hub or bearing portion 11, in which is a suitable bearing 12 for the shaft portion 13 of a drive eccentric 14. Coupled with the shaft portion 13 is a spindle 15, with which a suitable drive is adapted to be coupled. The casing 10 is open at its front end, as seen at 16 for reception of a cover, not shown, the cover giving access to a chamber 17, in which the mechanism of the tool is operated.

The casing 10 has a downwardly directed bearing extension 18, having a plain bore 19 for the reception of a tool head 20. The head 20 is in the form of a tubular body, having a threaded upper end portion 21, slidable in the bore 19 of the bearing 18, the upper portion of the head 20 being cut-away to form a square key member 22 adapted to receive a key 23.

It will be noted from a consideration of Fig. 1 of the drawing that the bore 19 is milled at opposite sides 24 to form a key recess, in which the key element 23 is adapted to seat, in order to retain the head 20 in one of four different positions of adjustment, the latter being controlled by the square key member 22. Engaging the threaded portion 21 is a lock sleeve nut 25, which has a sleeve portion 26 enveloping and guiding the lower enlarged portion 27 of the head 20.

The head 20 has a large diameter bore 28 and a smaller diameter bore 29, which opens into a flared workpiece receiving groove or throat 30 formed between the body 47 and the lower punch die end 31 of the head. The die end 31 has a bore 32, common in diameter with the bore 29, and this bore forms the die orifice, into which the reciprocating cutter or punch 33 is adapted to pass. The bore 32 opens into a larger diameter discharge passage 34, into which the lower reduced end 35 of the punch 33 passes.

Figure 3:
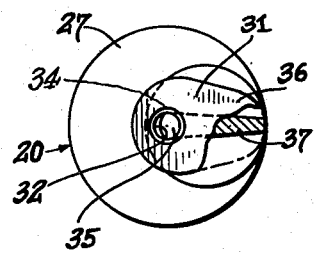
Fig. 3 is a bottom plan and sectional view of the lower head portion only of the tool.

The die end 31 is materially reduced in width, as compared to the body 27, as will appear from a consideration of Fig. 3 of the drawing and is contracted to one side of the body 27, as seen at 36. The die end 31 joins the body 27 in a narrow tapered fin or web 37, which is disposed centrally and longitudinally of the die 31.

The punch 33 has a large diameter portion 38, which fits snugly in the bore 28 and guides the punch in the operation thereof. The upper end of the punch has a round disc-like head 39, which has a rotatable bearing in a socket 40 of a drive disc 41, the lower portion of the disc 41, adjacent the head 39, being cut-away, as seen at 42.

Eccentrically disposed on the drive disc 41 is a drive pin 43 in the form of a screw, which is in threaded engagement with either one of two threaded apertures 44, 45 of the eccentric 14. The threaded apertures 44, 45 are eccentrically disposed with respect to the axis of the shaft portion 13, the aperture 44 being arranged closer to the axis than is the aperture 45, thus, in coupling the drive pin 43 with the respective apertures, the stroke of the punch 33 can be modified.

In adjusting the head 20, it will be apparent that the nut 25 is loosened and lowered sufficiently by the clearance 46, which is provided to enable the head to be pushed upwardly into the casing 10, so as to free the key 23 from the key groove defined by the surfaces 24 and facilitate the rotation of the head, so as to position the web 37 in any one of four different circumferential positions, thus adapting the tool to the performance of different cutting operations, or to suit the workpieces operated upon, as will be apparent.

Figure 4:
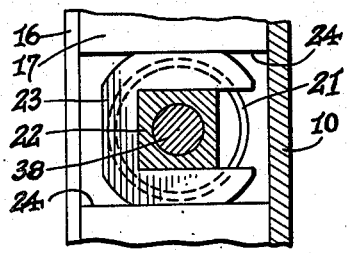
Fig. 4 is a section on the line 4—4 of Fig. 2.

Considering Fig. 4 of the drawing, it will appear that the key, or key element, 23 is in the form of a U-shaped member, which fits snugly in the recess, which forms the square key portion 22. The cross-head 23' of the key 23, as seen in Fig. 1, is directed outwardly with respect to the opening 16 and preferably has bevelled or rounded corners, so as to facilitate rotary movement of the key 23 within the chamber 17 of the casing, when the key 23 is moved out of engagement with the key shoulders 24, as above described.

In assembling and disassembling the tool, it will be understood that, after the drive head 41 has been coupled with one of the apertures 44, 45 through the drive pin 43, the hear 39 of the punch 33 can be coupled with the socket 40 by movement of the punch upwardly through the bore 19, when the head unit 20 is removed. Thereafter, the head unit is removed upwardly into the casing through the bore 19 with the nut 25 in its lowered position. This will expose the recess, having the square key portion 22 through the opening 16 and the key 23 can then be placed in position by hand, after which, the head with the key 23 thereon is lowered into the key recess formed by the shoulders 24 and the nut 25 is tightened. In this last operation, it will be understood that the head 20 will be adjusted to dispose the web 37 in the desired direction, or rather to expose the workpiece recess 30 in the position desired with respect to the tool. It will be understood that the drive to the spindle 15 may be through the medium of a flexible shaft or any other drive, depending upon the use of the tool.

It will be apparent that, in the rotation of the eccentric or member 14, the drive disc 41 is given a rotary reciprocating motion which, in turn, operates the punch 33, the head 39 of the punch having an oscillating movement in the disc in this operation.

From time to time, it will be necessary to replace the punch and this can be accomplished by removing the head unit 20 and slipping the head 39 of the punch out of the disc 41 and passing it down to the bore 19.

By virtue of the adjustability of the head unit, my improved nibbling tool can be utilized to cut sheet material having irregular contours such, for example, as corrugated sheet material without any appreciable distortion to the sheet.

Having fully described my invention, what I claim as new and desire to secure by Letters Patent is:

1. A nibbling tool, comprising a casing, a shaft rotatably mounted in the casing and having a coupling end protruding therefrom, the shaft having, within the casing, an eccentric member, a drive disc adjustably coupled with said member in control of the drive thereof, said disc having a socket opening through the periphery and through opposed side surfaces thereof, a head unit detachably mounted in the lower portion of the casing and projecting therefrom, a punch mounted in said unit, said punch having a disc head pivotally mounted in said socket, said unit having, at the lower portion thereof, a die into which said punch is adapted to pass, and said unit adjacent the die being recessed for the reception of a workpiece to be engaged by the punch in the operation of severing the workpiece.

2. A nibbling tool, comprising a casing, a shaft rotatably mounted in the casing and having a coupling end protruding therefrom, the shaft having, within the casing, an eccentric member, a drive disc adjustably coupled with said member in control of the drive thereof, said disc having a socket opening through the periphery and through opposed side surfaces thereof, a head unit detachably mounted in the lower portion of the casing and projecting therefrom, a punch mounted in said unit, said punch having a disc head pivotally mounted in said socket, said unit having at the lower portion thereof, a die into which said punch is adapted to pass, said unit adjacent the die being recessed for the reception of a workpiece to be engaged by the punch in the operation of severing the workpiece, said die joining the head at said recess in a fin-like web, said head unit being rotatably adjustable in said casing, said rotatable adjustment comprising a key mounted on the unit, a keyway in the casing engaged by said key, and a nut in threaded engagement with the unit for securely clamping the unit on the casing.

3. A nibbling tool, comprising a casing, a punch, driven means in the casing for reciprocating said punch, a cylindrical head mounted in the casing and in which said punch reciprocates, said head having a die at its lower end, into which the punch passes, the die joining the head in a fin-like web forming a large workpiece receiving recess around the major portion of the punch, means adjustably supporting the head in said casing to arrange said web in a number of different circumferential positions in the operation of the tool, the front of the casing being open, a cover closing said casing front, the inner end of the head having a recessed key portion accessible through the casing opening, and a key insertable into said recess through the casing opening in detachably supporting the head in said casing.

4. A nibbling tool, comprising a casing, a punch, driven means in the casing for reciprocating said punch, a cylindrical head mounted in the casing and in which said punch reciprocates, said head having a die at its lower end, into which the punch passes, the die joining the head in a fin-like web forming a large workpiece receiving recess around the major portion of the punch, means adjustably supporting the head in said casing to arrange said web in a number of different circumferential positions in the operation of the tool, the front of the casing being open, a cover closing said casing front, the inner end of the head having a recessed key portion accessible through the casing opening, a key insertable into said recess through the casing opening in detachably supporting the head in said casing, said key fitting a keyway in the casing in adjustable support of the head, and a sleeve nut adjustable on the head to control adjustable securing and detachment of the head with respect to said casing.

5. A nibbling tool, comprising a casing, a driven shaft rotatable in the casing and having means projecting from the casing for coupling with a suitable drive, an eccentric member on said shaft within the casing, the lower portion of the casing having means for guiding a punch, said last named means including, at its lower end, a die, in connection with which said punch operates, a drive disc, with which the upper end of the punch is movably coupled, said member having a pair of threaded apertures eccentrically disposed thereon, and a threaded pin eccentrically disposed on said disc and adapted to be positioned in one of said apertures in control of the operation of said punch.

HAROLD HEDSTROM.

REFERENCES CITED

The following references are of record in the file of this patent:

UNITED STATES PATENTS

| Number | Name | Date |
| --- | --- | --- |
| 1,651,823 | Kelleher | Dec. 6, 1927 |
| 2,272,295 | Forss | Feb. 10, 1942 |